United States Patent [19]
Johannsen

[11] 3,882,521
[45] May 6, 1975

[54] PHOTOGRAPHIC APPARATUS

[76] Inventor: Hans Werner Johannsen, Hegebachstrasse 46, 6333 Braunfels, Germany

[22] Filed: Oct. 10, 1972

[21] Appl. No.: 296,086

[30] Foreign Application Priority Data
Oct. 14, 1971 Germany.......................... 2151123

[52] U.S. Cl. ............................ 354/79; 354/81
[51] Int. Cl. ........................................ G03b 29/00
[58] Field of Search .......... 95/12, 86; 352/131, 244; 350/145; 354/81, 79, 293

[56] References Cited
UNITED STATES PATENTS

| | | | |
|---|---|---|---|
| 446,369 | 2/1891 | Whitney | 354/79 |
| 2,882,791 | 4/1959 | Moller et al. | 95/12 X |
| 2,933,026 | 4/1960 | Winzenburg | 95/12 |
| 2,933,992 | 4/1960 | Bushnell | 95/12 |
| 2,937,584 | 5/1960 | Gesualdi | 95/12 |
| 2,990,759 | 7/1961 | Marcosky | 95/12 |
| 3,399,612 | 9/1968 | Korte | 95/86 X |
| 3,687,031 | 8/1972 | Jahnsman | 95/12 X |

*Primary Examiner*—Samuel S. Matthews
*Assistant Examiner*—Alan Mathews
*Attorney, Agent, or Firm*—Karl F. Ross; Herbert Dubno

[57] ABSTRACT

For the purpose of producing a compact instrument, a double or binocular telescope/camera assembly in which the camera is equipped with its own viewfinder system and arranged between the two telescope halves, or components, has the optical axis of the camera objective at right angles to the plane including the optical axes of these components; in a preferred embodiment, the camera, which may be designed for stills but is preferably of the cinematographic type, is pivotable through a right angle relative to the binocular system in the plane of symmetry of the latter and the direction in which the film is transported is preferably parallel to the optical axes of the telescope halves.

4 Claims, 8 Drawing Figures

PHOTOGRAPHIC APPARATUS

FIELD OF THE INVENTION

My present invention relates to a dual-purpose optical instrument comprising a double or binocular telescope and a camera camera disposed between the two halves or optical components of the telescope.

BACKGROUND OF THE INVENTION

Instruments are known in which a photographic camera forms a unit with a prismatic or Galilean telescope. In most of these instruments the telescope is used as a viewfinder for the camera, and the objects are photographed via a tele-objective matched to the telescope.

This is disadvantageous in that the relatively large focal length of the telescope, which also acts as the viewfinder and to which the focal length of the photographic objective is approximately matched, generally makes it impossible to take freehand photographs because of the danger of vibration. With such a camera, which is at least partially optically integrated with the telescope, it was hitherto therefore possible only to take photographs with the aid of a tripod and with an extremely small field of vision.

A further disadvantage of such a combination is considered to be that the camera whose dimensions are dictated by its function, and which (though relatively flat) has a wide body, considerably increases the size of the overall apparatus, i.e., also that of the telescope associated with the camera, as a result of which the apparatus turns out heavy and cumbersome.

OBJECT OF THE INVENTION

It is an object of this invention to provide a combination of binocular telescope and camera which is convenient to use, which enables photographs to be taken with objectives of any desired focal length and which enables the user to take freehand photographs.

SUMMARY OF THE INVENTION

I achieve, this object, in accordance with the present invention, by an arrangement in which the optical axis of the objective of the camera is disposed, at least in a normal position, at right angles to the plane which includes the optical axes of the two halves or optical components of the telescope, the camera being equipped with its own viewfinder.

As a result of this transverse arrangement of the camera relative to the telescope, the outline of the camera is optimally matched to that of the telescope, and the camera's viewfinder system enables a camera objective of normal focal length to be used.

In use, this telescope is held in the usual manner. For the purpose of taking photographs the combination is held in such a way that the camera viewfinder is disposed in front of the eye. The exposure-release button, the film-transporting mechanism and other operating elements are operated as in the case of conventional still- or motion-picture cameras.

In a particular embodiment of the invention, the objective of the camera is arranged between the halves of the telescope for pivotal movement in the plane of symmetry of the telescope. Advantageously, in this embodiment, the direction of film travel is not transverse but parallel to the optical axes of the halves of the telescope.

In the initial position of the camera, the optical axis of its objective is, as in the previously described embodiment, disposed at right angles to the plane which includes the telescope axes; in this position photographs are taken with an objective of normal focal length. The purpose of the pivoting arrangement is to swing the camera through 90° when it is used as a telecamera and then to work with a tele-objective which is attached to the apparatus and is of such optical parameters (focal length, field angle) as to match the field of vision of the telescope. In this case the object to be photographed is viewed not through the viewfinder of the camera but through the eyepieces of the telescope.

A significant advantage of the invention is the combination into one unit of two optical instruments which are capable of separate operation and whose size exceeds that of conventional binoculars to only an insignificant extent.

BRIEF DESCRIPTION OF THE DRAWING

A number of embodiments of the invention will now be described, by way of example, with reference to the accompanying diagrammatic drawings in which.

SPECIAL DESCRIPTION

The apparatus according to my invention consists of a camera 1 (FIGS. 1–4) or 1' (FIGS. 5–8) interposed between the two halves or optical components 2 and 3 of an associated telescope of the binocular type. The telescope portions 2 and 3 are mounted for pivotal movement about axes 4 and 5 for adjustment according to the spacing of the viewer's eyes, i.e., over an angular range $a$.

Figure 2:
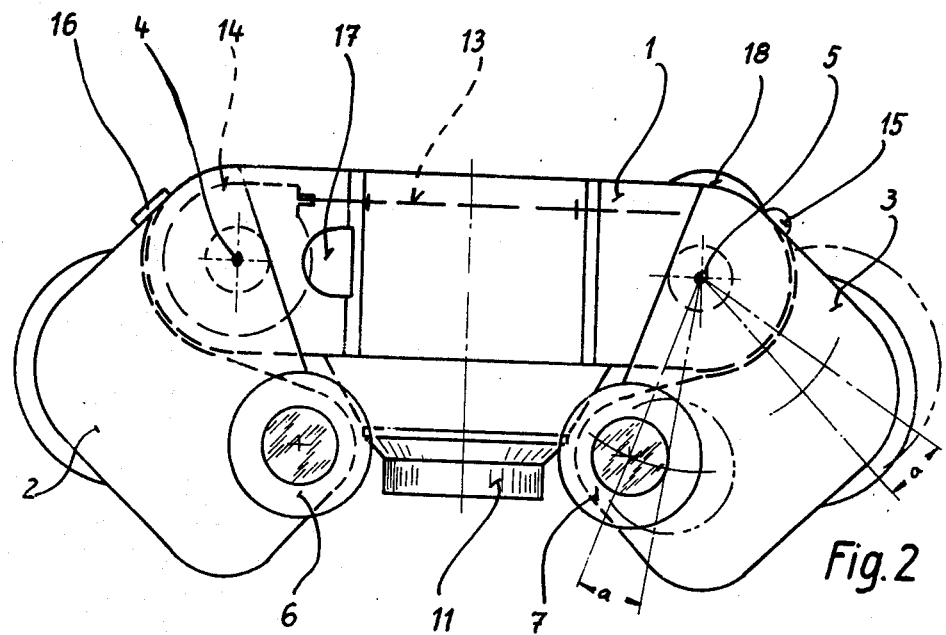
FIG. 2 shows the eyepieces of the telescope with the camera arranged therebetween.
Figure 1:
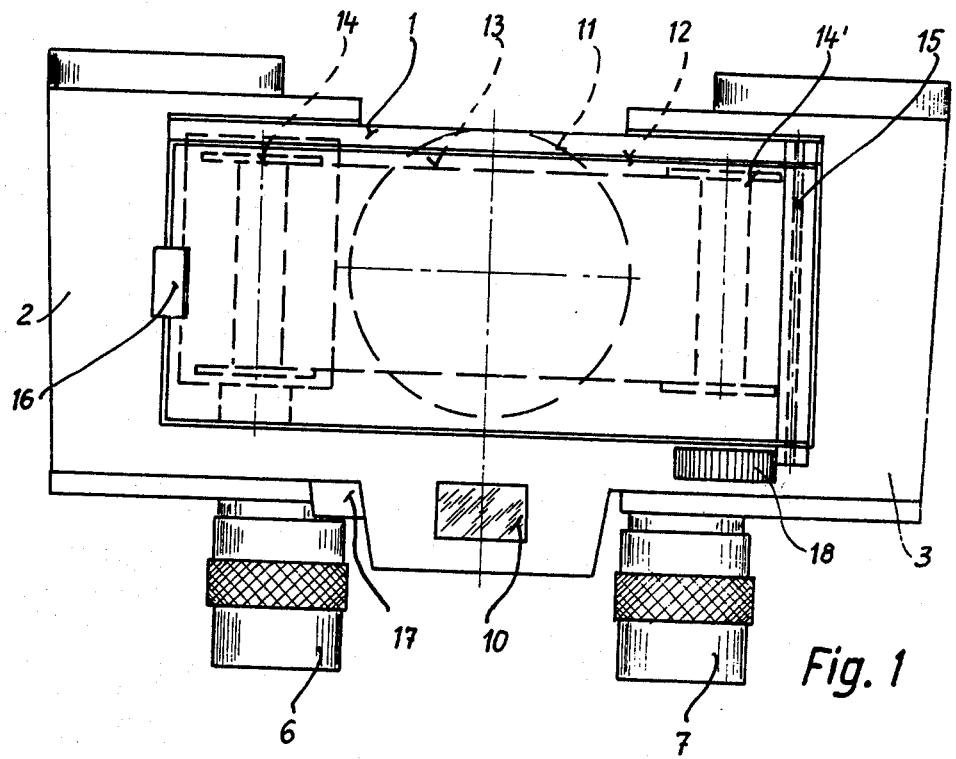
FIG. 1 shows a plan view of a first embodiment of my invention, comprising a telescope combined with a camera.
Figure 4:
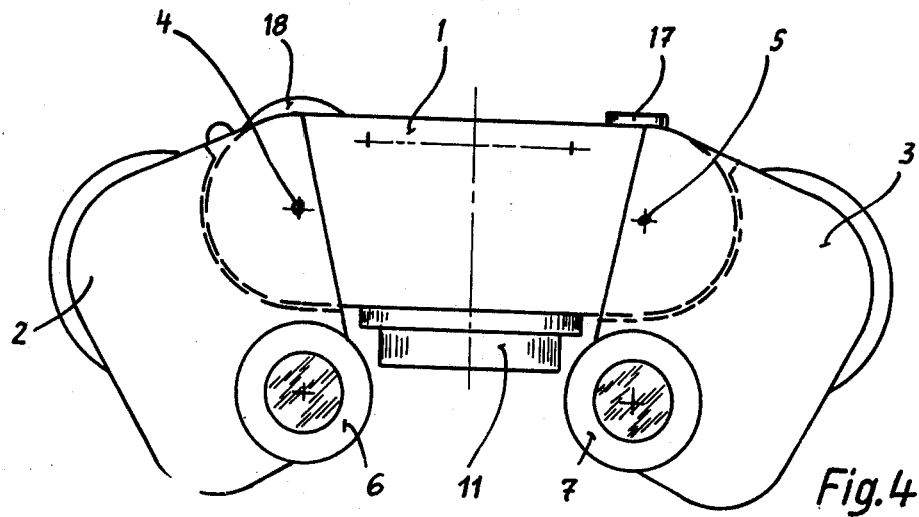
FIGS. 3 and 4 show a second embodiment constituting a modification of the arrangement of FIGS. 1 and 2.
Figure 5:
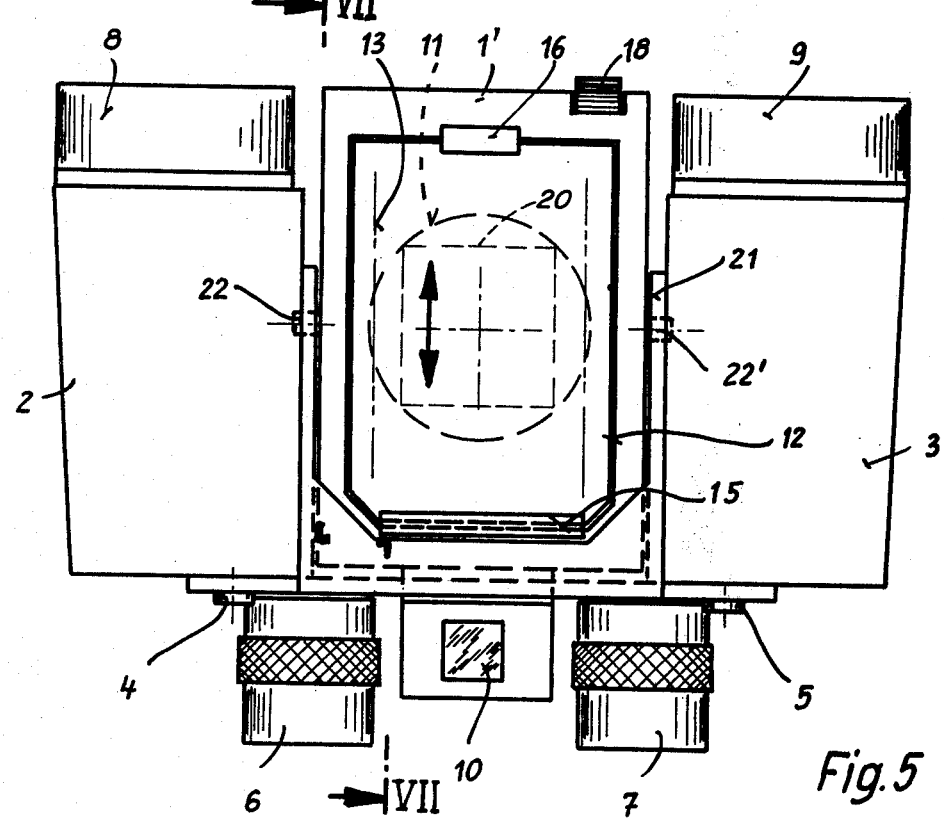
FIG. 5 shows a plan view of a third embodiment, including a pivotable camera.

In the arrangement shown in FIGS. 1 and 5, a viewfinder 10 for the camera 1 or 1' is accommodated between the two telescopic eyepieces 6 and 7 and is bisected by a plane of symmetry including the axis of a camera objective 11. In the arrangement shown in FIG. 3, this viewfinder is located between the two objectives 8 and 9 of the telescope.

The objective of the camera lies protected between the telescope portions 2 and 3 which form a frame around the camera body. On the top of the apparatus a hinged lid 12 for a film chamber with a film 13 and spools 14 and 14' can be seen, this film forming an image plane parallel to the optical axes of components 2 and 3. For removing the film 13, the lid 12 is swung open about its hinge 15. A catch 16 locks the lid 12 while the apparatus is in use.

An exposure-release button 17 is arranged in a manner depending on the configuration of the camera. A knurled knob 18 serves for advancing or transporting the film.

Figure 3:
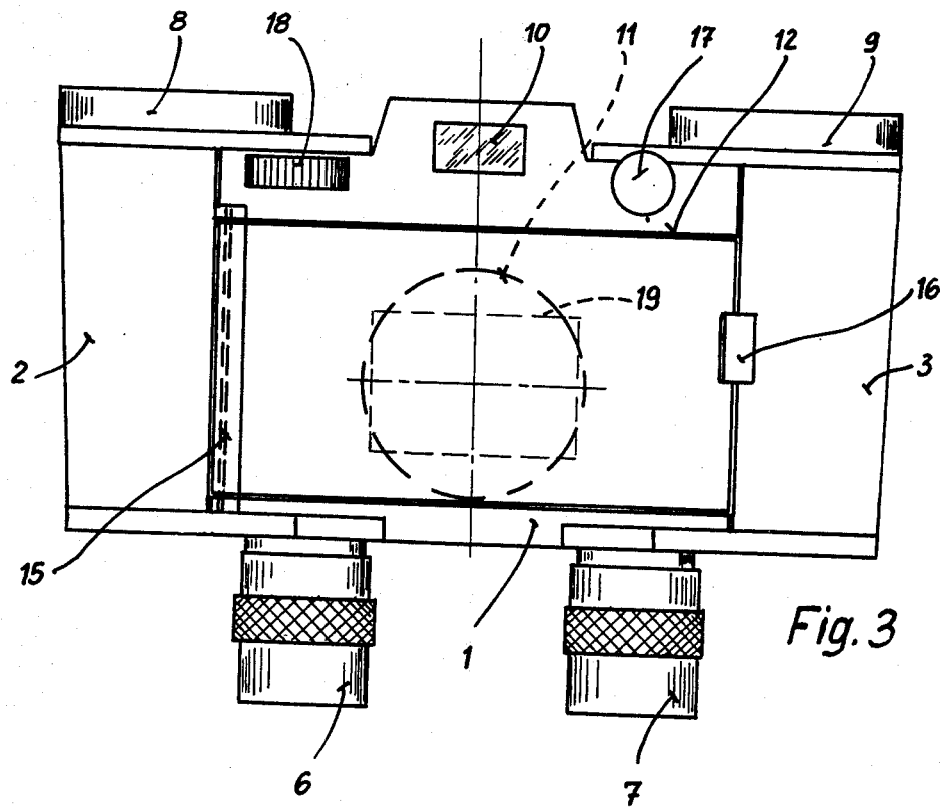
Figure 6:
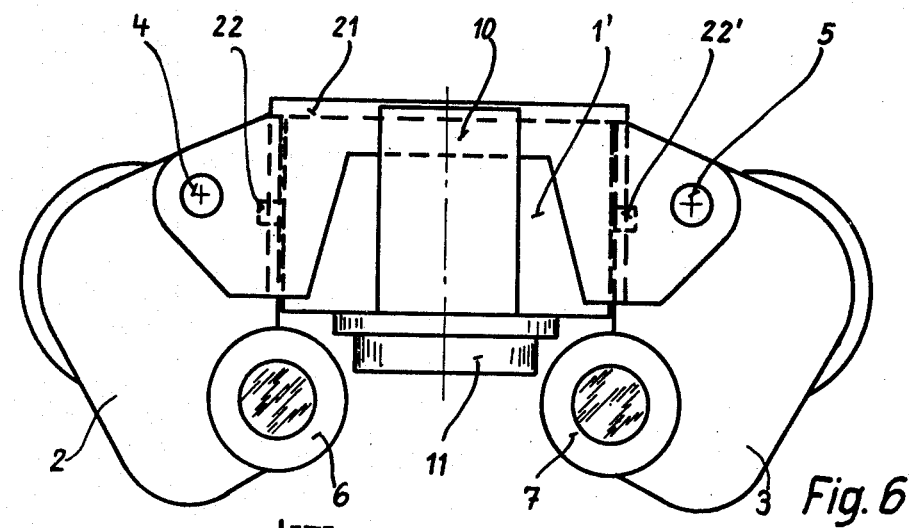
FIG. 6 shows the telescope eyepieces of the apparatus of FIG. 5.

Whereas in FIG. 3 the film format 19 shown dotted is rectangular, the film format 20 is shown square in FIG. 5. With a view to reducing the dimensions of the combination, particularly those of the camera, a square format is more suitable, particularly for the embodiment shown in FIGS. 5 to 8.

The camera 1' of FIGS. 5–8, which here is arranged for pivotal movement between the two lateral portions 2 and 3 of its supporting frame, is in a yoke 21 by means of two trunnions 22 and 22'. The yoke 21 in turn is bracketed by the two telescope portions 2 and 3 to which it is attached by two link pins 4 and 5. As shown by the double-headed arrow in FIG. 5, the film is transported in a direction parallel to the optical axes of the two halves of the telescope, i.e., the axes of its spools 14, 14' are transverse to the plane of symmetry of the frame which is also the swing plane of the camera body.

Figure 7:
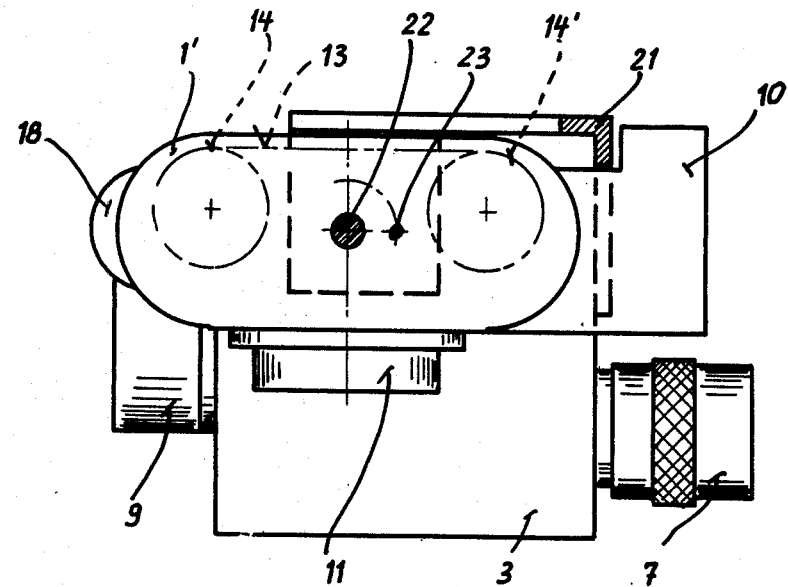
FIG. 7 shows a section taken on the line VII—VII of FIG. 5.
Figure 8:
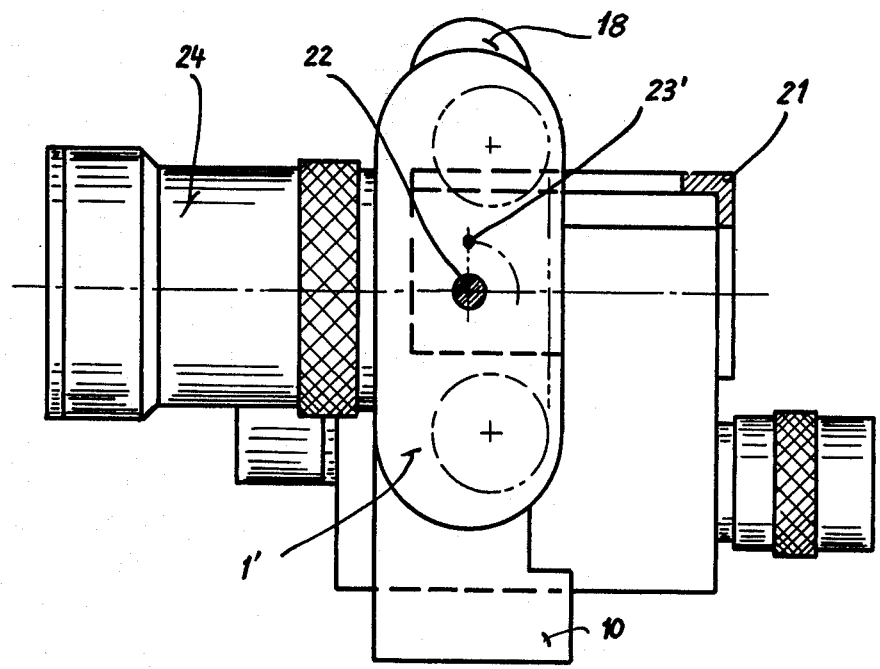
FIG. 8 shows a view corresponding to FIG. 7 with the camera in its alternate position.

FIGS. 7 and 8 show cross-sections through the apparatus on the line VII—VII in FIG. 5 for the two operational positions of the camera. The position of the camera 1', equipped with an objective 11 of normal focal length, e.g., 35 or 50 mm, in FIG. 7 corresponds to the position of the camera shown in FIGS. 2 or 4 which is fixedly built into the apparatus. In FIG. 8 the camera has been rotated through 90° about the trunnions 22, 22'. In this position it can be equipped with a tele-objective 24, which could not be accommodated between the telescope halves 2, 3 (cf. FIG. 6) on account of its diameter. The objectives 9 and 24 can be interchanged in known manner. The camera is indexable in either of its two operational positions in the support 21 by means of locating members 23 and 23'.

I claim:

1. A dual-purpose optical instrument comprising:
    a frame having a pair of lateral portions provided with respective eyepieces and objectives together constituting a binocular telescope with a pair of parallel optical axes defining an axial plane; and
    a camera body supported on said frame between said lateral portions, said body being provided with a film chamber, a camera objective disposed centrally thereon with an optical axis perpendicular to said axial plane in a first position, film-transport means in said chamber defining an image plane parallel to said axial plane in said first position, and a viewfinder bisected by a plane of symmetry of said telescope including the optical axis of said camera objective;
    said frame being provided with pivotal mounting means for said body enabling a rotation thereof through 90° from said first position into a second position, with the optical axis of said camera objective swinging in said plane of symmetry into parallelism with said axial plane.

2. An instrument as defined in claim 1 wherein said film-transport means comprises a pair of spools with axes transverse to said plane of symmetry.

3. An instrument as defined in claim 1 wherein said frame comprises a yoke bracketed by said lateral portions and locating means for selectively indexing said body in either of said positions.

4. An instrument as defined in claim 1, further comprising a tele-objective attachable to said camera body in place of said camera objective in said second position, said tele-objective having optical parameters matching the field of view of said camera objective to that of said binocular telescope.

* * * * *